United States Patent [19]

Schwer et al.

[11] Patent Number: 5,294,047
[45] Date of Patent: Mar. 15, 1994

[54] ELECTRONIC THERMOSTAT TIMER

[75] Inventors: Thomas Schwer, Triberg; Bernd Maier, St. Georgen, Fed. Rep. of Germany

[73] Assignee: Grasslin KG, Fed. Rep. of Germany

[21] Appl. No.: 940,891

[22] PCT Filed: Mar. 27, 1992

[86] PCT No.: PCT/DE92/00257

§ 371 Date: Oct. 23, 1992

§ 102(e) Date: Oct. 23, 1992

[30] Foreign Application Priority Data

Apr. 6, 1991 [DE] Fed. Rep. of Germany ....... 9104170

[51] Int. Cl.⁵ .............................................. F23N 5/20
[52] U.S. Cl. ................................ 236/46 R; 236/91 R
[58] Field of Search .................... 236/46 R, 47, 91; 165/12; 307/141

[56] References Cited

U.S. PATENT DOCUMENTS

| | | |
|---|---|---|
| 3,867,642 | 2/1975 | Ajrlahi . |
| 4,252,270 | 2/1981 | Taylor ................................. 236/47 |
| 4,819,714 | 4/1989 | Otsuka et al. ................... 236/46 R |
| 4,837,731 | 6/1989 | Levine et al. ................... 236/46 R |
| 5,107,918 | 4/1992 | McFarlane et al. ............. 236/46 R |

FOREIGN PATENT DOCUMENTS

| | | |
|---|---|---|
| 0176617 | 4/1986 | European Pat. Off. . |
| 2916748 | 10/1980 | Fed. Rep. of Germany . |
| 9003507 | 7/1990 | Fed. Rep. of Germany . |
| 1264870 | 2/1972 | United Kingdom . |

*Primary Examiner*—William E. Wayner
*Attorney, Agent, or Firm*—Hill, Steadman & Simpson

[57] ABSTRACT

In an electronic thermostat timer having a time-keeping switch and having a thermostat, having an optoelectronic display (6) arranged at the front side of the housing for the time of day, the switching times and the switching temperatures, having a manual, key-shaped input device (7) for the time of day, the switching times and the switching temperatures in a common housing (1), the housing (1) is provided with a quadratic cross section, particularly having the edge dimensions 60×60 mm. A cylindrical clockface dial (3) is provided at the front side (2) of the housing (1), the outer circumference of said cylindrical clockface dial partially projecting beyond the sides (17) of the housing (1). A thermostat module (5) that is covered by a housing cover (10) is arranged at the back side (4) of the housing (1).

9 Claims, 1 Drawing Sheet

ELECTRONIC THERMOSTAT TIMER

BACKGROUND OF THE INVENTION

The invention is directed to an electronic thermostat timer having a time-keeping switch means and having a thermostat, having an optoelectronic display means arranged at the front side of the housing for the time of day, the switching times and the switching temperatures, having a manual, key-shaped input means for the time of day, the switching times and the switching temperatures, in a common housing.

In such thermostat timers that can be practically employed not only for a time-controlled temperature regulation of dwelling spaces but also for air conditioning units having heating and/or cooling function, freezer chests, refrigeration rooms and refrigerators, particularly as what are referred to as defroster controls as well, it is necessary—particularly when these are intended to be built-in—that the external dimensions of the overall device be optimally small and compact without the technical demands made of the thermostat being thereby deteriorated. It should thereby be assured that the inertia of such a thermostat is appropriately matched to the respective requirements. As necessary, moreover, what are referred to as optimization functions having up to four temperature levels should be possible, first with a comfort temperature control at 21° C., second with a day time temperature control lowered under chronological control at approximately 19° C., third with a night temperature control lowered under chronological control at approximately 16° C. and, fourth, an antifreezing temperature control at about 5° C., as well as with what is referred to as an automatic surge aeration unit.

It is also required in such thermostat timers that, first, the electrical installation terminals can be placed corresponding to the respective, requirements without the installation orientation of the device having to be changed as a result thereof and that, second, an arrangement of the temperature sensor corresponding to the respective requirements is also possible in addition to a monitoring of the power reserve of the device.

In known electromechanical or electronic thermostat timers, the switch clock and the thermostat are arranged lying spatially side-by-side in a rectangularly fashioned housing that is relatively large in terms of space. The electrical installation terminals are invariably arranged thereat in a specific region of the housing.

These known thermostat timers are relatively large in size and their employment is correspondingly limited.

SUMMARY OF THE INVENTION

The object of the invention is to eliminate the disadvantages of the known thermostat timers and to create a corresponding device that has optimally small housing dimensions that enables an expediently alignable orientation of the installation terminals and that is flexible in view of the arrangement of the temperature sensor. Moreover, a display of the actual temperature and of the power reserve of the switch clock should be assured thereat.

This object is achieved by an electronic thermostat time having in a common housing a time-keeping switch means and a thermostat, an optoelectronic display means arranged at a front side of the housing for the time of day, the switching times and the switching temperatures, a manual key-shaped input means for the time of day, the switching times and the switching temperatures. The housing is provided with a quadratic cross section, particularly having the edge dimensions 60×60 mm. A cylindrical clockface dial is provided at the front side of the housing, an outer circumference of the cylindrical clockface dial partially projecting beyond sides of the housing. A thermostat module which is covered by a housing cover is arranged at the back side of the housing.

Advantageous developments of the present invention are as follows. The clockface dial is rotatably seated and secured vis-a-vis the housing, particularly in a grid of approximately 90°. The clockface dial is rotatably seated and fastened vis-a-vis the housing and/or installation terminals of the thermostat timer in latching fashion. The thermostat module is provided with an integrated temperature sensor and/or with a remote temperature sensor. An electrical plug for connection of a remote temperature sensor is provided at the back side of the housing cover. The display means displays the time of day, the switching time, the switching temperature, the actual temperature and the power reserve of the device.

What is advantageous in the new thermostat timer is not only that the housing is lent a quadratic cross section, particularly an edge dimension of 60×60 mm—this having become possible due to the arrangement of the modularly constructed thermostat at the back side of the switch clock module—, but also as a result of the rotatability of the cylindrical clockface dial, particularly by respectively 90° vis-a-vis the electrical installation terminals. The temperature sensor integrated in the device and/or the provision of a remote temperature sensor is also advantageous, as is the optoelectronic actual temperature display and a monitoring display of the power reserve of the thermostat timer.

BRIEF ESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawing, and in which:

FIG. 1 a front view of the thermostat timer;

FIG. 2 a side view of the thermostat timer of FIG. 1; and

FIG. 3 a back view of the thermostat timer of FIG. 1.

DESCRIPTION OF THE PREFERRED EMBODIMENT

Figure 1:
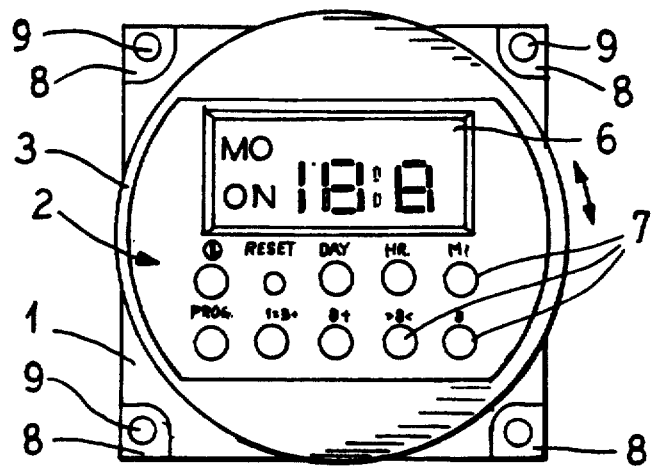

The thermostat timer shown in FIG. 1 is essentially composed of the housing 1 having a quadratic cross section, particularly having the edge dimensions of 60×60 mm. An optoelectronic display means 6 for digital display of the time of day, of the switching times, of the switching temperatures as well as of the actual temperature is provided on the front side 2 of the cylindrical clockface dial 3 which is arranged spatially raised on the housing 1 and which can be mounted rotatable relative thereto, particularly in the range of 90°. Optoelectronic display means in the form of electronically excited, symbolic segments for the respective switching conditions, the switching days as well as for the power reserve of the device are also situated thereat.

A keyboard 7 is provided for the manual input of the time of day, of the possible switching times, in detail for the comfort temperature, the day time lowering, the night time lowering, the antifreezing protection, the start of time for defrost, the defrost duration and potential inhibited times and of the switching temperatures. Also provided is 4 mounting fastening flange 8 with fastening holes 9 that are arranged in the region of the corners of the housing 1.

Figure 2:
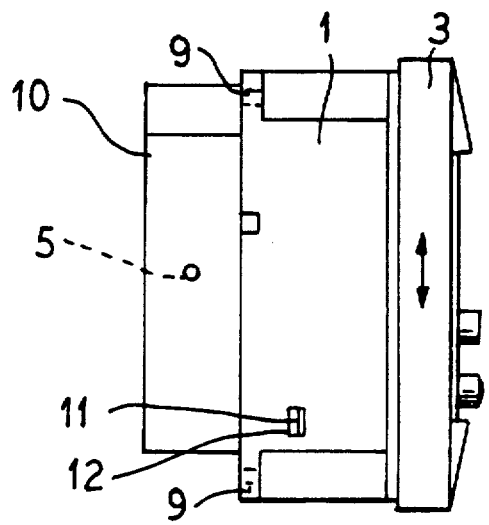

FIG. 2 depicts the housing 1, the clockface dial 3 at the front side of the housing 1 and the thermostat module 5 arranged at the back side of the housing 1 and which is covered thereat by a housing cover 10. The housing cover 10 is detachably latched onto the housing 1 with catch latches 11. A catch engagement 12 is provided the housing 1. The clockface dial 3 can have its back side provided with a modularly constructed, electronic, time-keeping switch mean or module. As already described in FIG. 1, the clockface dial 3 together with the time-keeping switch module secured thereat is seated rotatable vis-a-vis the housing 1 and the electrical installation terminals provided thereat, particularly in latching fashion.

Figure 3:
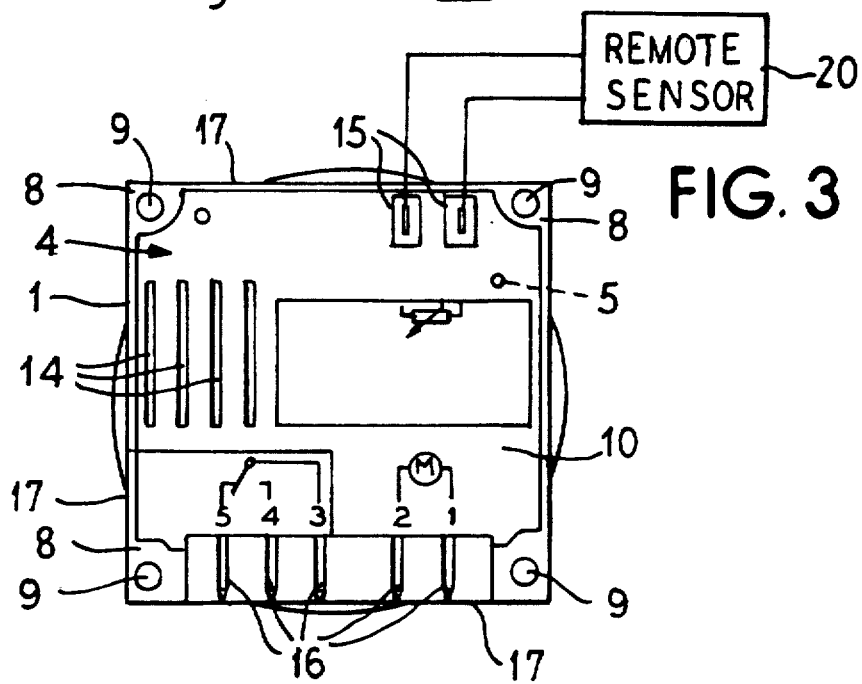

FIG. 3 shows the housing 1 in detail together with the thermostat module 5 put in place on the back side 4 thereof, this thermostat module 5 being covered by the housing cover 10. In special cases, the thermostat module 5 can also be arranged without housing cover 10, directly on the back side 4 of the housing 1. A number of housing openings 14 are provided behind which the temperature sensor (not shown in detail) integrated in the device is arranged. A two-pole plug 15 is provided the connection of a remote temperature sensor 20 of the electronic thermostat.

Number 16 indicates the plug-shaped, electrical installation terminals 16 which, partially let into the housing 1, are arranged at the outside of the housing 1 which has the mounting fastening flanges 8 and the fastening holes 9. FIG. 3 shows, the outer circumference of the cylindrical clockface dial 3 arranged at the front side of the housing respectively projects slightly beyond the sides 17 of the housing 1.

It is also provided in a modification of the invention that the thermostat is not modularly fashioned and is not arranged on the back side 4 of the housing 1; but, rather, this is directly integrated in the electronics, particularly in an appropriate microprocessor of the whole, whereby this electronics is arranged in a housing 1 without the previous thermostat structure at the back side of the housing. It is also provided in this context that a thermostatically controlled aerator terminal is provided thereat for certain applications.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. An electronic thermostat timer having in a common housing a thermostat, an optoelectronic display means arranged at a front side of the temperatures, and a keyboard for manual input of the time of day, the switching times and the switching temperature, comprising: the housing having a quadratic cross section; a cylindrical clockface dial at the front side of the housing, an outer circumference of said cylindrical clockface dial partially projecting beyond sides of the housing; and a thermostat module, which is covered by a housing cover, at a back side of the housing.

2. The thermostat timer according to claim 1, wherein the clockface dial is rotatably seated and secured vis-a-vis the housing.

3. The thermostat timer according to claim 2, wherein the clockface dial is rotatably seated and fastened vis-a-vis the housing and/or installation terminals of the thermostat timer in latching fashion.

4. The thermostat timer according to claim 2, wherein the clockface dial is rotatably seated and secured vis-a-vis the housing in a range of approximately 90°.

5. The thermostat timer according to claim 1, wherein the thermostat module has an integrated temperature sensor and/or a remote temperature sensor.

6. The thermostat timer according to claim 5, wherein connection of a remote temperature sensor is located at the back side of the housing cover.

7. The thermostat timer according to claim 1, wherein the display means displays the time of day, the switching time, the switching temperature, actual temperature and power reserve of the thermostat timer.

8. The thermostat timer according to claim 1, wherein the housing has a quadratic cross section with edge dimensions of 60×60 mm.

9. The thermostat timer according to claim 3, wherein the clockface dial is rotatably seated and secured vis-a-vis the housing in a range of approximately 90°.

* * * * *